(12) United States Patent
Hiltunen et al.

(10) Patent No.: US 11,014,779 B2
(45) Date of Patent: *May 25, 2021

(54) PASSENGER TRANSPORT SYSTEM

(71) Applicant: Kone Corporation, Helsinki (FI)

(72) Inventors: Jussi Hiltunen, Helsinki (FI); Otto Miettinen, Helsinki (FI); Timo Tiainen, Vantaa (FI); Kim Bergman, Helsinki (FI); Stefano Vaccari, Costabissara (IT); Visa Rauta, Hyvinkaa (FI); Tommi Salonen, Helsinki (FI); Minna Piironen, Klaukkala (FI); Jukka Korpihete, Helsinki (FI); Dipti Sonawane, Helsinki (FI)

(73) Assignee: Kone Corporation, Helsinki (FI)

( * ) Notice: Subject to any disclaimer, the term of this patent is extended or adjusted under 35 U.S.C. 154(b) by 0 days.

This patent is subject to a terminal disclaimer.

(21) Appl. No.: 16/850,161

(22) Filed: Apr. 16, 2020

(65) Prior Publication Data

US 2020/0239276 A1 Jul. 30, 2020

Related U.S. Application Data

(63) Continuation of application No. 16/288,901, filed on Feb. 28, 2019, now Pat. No. 10,669,120, which is a (Continued)

(51) Int. Cl.
*B66B 1/46* (2006.01)
*H04W 4/80* (2018.01)
(Continued)

(52) U.S. Cl.
CPC .......... *B66B 1/468* (2013.01); *B66B 1/3461* (2013.01); *B66B 3/006* (2013.01); *H04W 4/80* (2018.02);
(Continued)

(58) Field of Classification Search
CPC ....... B66B 1/468; B66B 1/3461; B66B 3/006; B66B 1/2408; B66B 2201/405;
(Continued)

(56) References Cited

U.S. PATENT DOCUMENTS 6,382,363 B1 * 5/2002 Friedli ................... B66B 1/468
187/384
10,252,881 B2 4/2019 Hiltunen et al.
(Continued)

FOREIGN PATENT DOCUMENTS

CN 104271483 A 1/2015
EP 0603859 A1 6/1994
(Continued)

OTHER PUBLICATIONS

International Search Report PCT/ISA/210 for International Application No. PCT/EP2015/061418 dated Feb. 16, 2015.
(Continued)

*Primary Examiner* — Yuwen Pan
*Assistant Examiner* — Angelica M Perez
(74) *Attorney, Agent, or Firm* — Harness, Dickey & Pierce, P.L.C.

(57) ABSTRACT

A passenger transport system includes a plurality of passenger transporters controlled by a transport system control, and further comprises at least one parameter memory configured to store at least one parameter or parameter set for the function of at least one transport system component, which transport system comprises a first wireless interface. The first interface may input data regarding at least one stored parameter or parameter set for the function of the related transport system component(s). The passenger transport system comprises mobile devices carried by users, which mobile devices may communicate wirelessly with the first interface, which communication is based on a short range
(Continued)

transmission. The mobile devices may be prompted by the first interface to transmit data regarding the parameter or parameter set of the correlated transport system component. A passenger system interaction with a user to individual user requirements may be customized.

17 Claims, 2 Drawing Sheets

Related U.S. Application Data continuation of application No. 15/817,589, filed on Nov. 20, 2017, now Pat. No. 10,252,881, which is a continuation of application No. PCT/EP2015/061418, filed on May 22, 2015.

(51) Int. Cl.
| | |
|---|---|
| *B66B 1/34* | (2006.01) |
| *B66B 3/00* | (2006.01) |
| *B66B 1/24* | (2006.01) |
| *G07C 9/00* | (2020.01) |
| *H04L 29/08* | (2006.01) |
| *H04W 8/00* | (2009.01) |

(52) U.S. Cl.
CPC ....... *B66B 1/2408* (2013.01); *B66B 2201/405* (2013.01); *B66B 2201/4615* (2013.01); *B66B 2201/4653* (2013.01); *B66B 2201/4661* (2013.01); *G07C 9/00309* (2013.01); *G07C 2009/00507* (2013.01); *H04L 67/34* (2013.01); *H04W 8/005* (2013.01)

(58) Field of Classification Search
CPC .... B66B 2201/4653; B66B 2201/4661; B66B 2201/4615; H04B 1/3461; G07C 9/00309; G07C 2009/00507; H04W 4/80; H04W 8/005
USPC ...................................................... 455/41.2
See application file for complete search history.

(56) References Cited

U.S. PATENT DOCUMENTS

| | | | |
|---|---|---|---|
| 2012/0138388 A1* | 6/2012 | Finschi | ................. B66B 1/2458 187/247 |
| 2013/0297093 A1 | 11/2013 | Nowel | |
| 2018/0162688 A1* | 6/2018 | Troesch | .................. G05B 15/02 |

FOREIGN PATENT DOCUMENTS

| | | | |
|---|---|---|---|
| WO | WO-2010086290 A1 | | 8/2010 |
| WO | WO 2012/093985 | * | 7/2012 |
| WO | WO-2012093985 A1 | | 7/2012 |

OTHER PUBLICATIONS

Written Opinion PCT/ISA/237 for International Application No. PCT/EP2015/061418 dated Feb. 16, 2016.
Chinese Office Action dated Jan. 29, 2019 for corresponding Chinese Application No. 2015800802062.

* cited by examiner

PASSENGER TRANSPORT SYSTEM

This application is a continuation of U.S. application Ser. No. 16/288,901, filed on Feb. 28, 2019, which is a continuation of U.S. application Ser. No. 15/817,589, filed on Nov. 20, 2017, which is a continuation of PCT International Application No. PCT/EP2015/061418 which has an International filing date of May 22, 2015, the entire contents of each of which are incorporated herein by reference.

BACKGROUND OF THE INVENTION

The present invention relates to a passenger transport system having a plurality of passenger transporters as e.g. elevators, escalators, moving walks, moving ramps etc. controlled by a transport system control. The passenger transport system has a lot of passenger transport system components which are distributed over the building as e.g. illumination, elevator doors, drive motors, voice actuation, displays, ventilation etc. The passenger transport system further comprises at least one parameter memory configured to store at least one parameter or parameter set for the operation of at least one of said transport system components. Usually, the passenger transport system of this kind has operation parameters stored for almost any of the different transport system components which meet the requirements of most passengers in an optimized manner but on a statistical base. It can therefore happen that operational parameters of the transport system components, as e.g. door opening time, are not adapted for certain passengers which fall out of this statistic frame. Accordingly, an aged person might have trouble to get into an allocated elevator if the door opening time is too short.

SUMMARY OF THE INVENTION

It is therefore object of the invention to create a passenger transport system of the above mentioned type which is better suited to meet specific demands of individual users.

The object of the invention is solved with a passenger transport system according to claim 1. Preferred embodiments are subject-matter of the dependent claims. Some inventive embodiments are also discussed in the descriptive section of the present application as well as in the figures. The inventive content may also consist of several separate inventions, especially if the invention is considered in the light of expressions or implicit subtasks or from the point of view of advantages achieved. In this case, some of the attributes contained in the claims below may be superfluous from the point of view of separate inventive concepts. In addition, it can be stated that at least some of the dependent claims can in at least some situations be deemed to be inventive in their own right.

According to the invention, the transport system, particularly the transport system control for the plurality of passenger transporters comprises at least one first wireless interface, preferably in the vicinity of at least one of the transport system components, which first interface is configured to input data regarding at least one parameter or parameter set for the operation of at least one transport system component. On the other hand, the passenger transport system comprises mobile devices carried by transport system users which mobile devices communicate wirelessly with the first interface, which communication is based on a short range transmission as e.g. NFC, RFID, Bluetooth. The mobile device is prompted by the communication with the interface to transmit data regarding the parameter for the transport system component. This means that the mobile device is configured to be prompted by the first interface to transmit data regarding the parameter or parameter set of the correlated transport system component. This enables an operation parameter or operation parameter set of the at least one transport system component to be influenced by data transmitted by the mobile device to meet individual requirements of the user. Accordingly, the invention allows the customizing of a passenger system interaction with a user to individual user requirements.

The setting of the parameters may be location-dependent or global. Thus, a parameter as e.g. the door-opening time, maybe set differently for different doors (e.g. basement and destination floor) or to be the same for all doors.

The data transmitted from the mobile device to the first interface can be of different nature. In a very simple alternative, this data may be simple ID data of the mobile device which ID data is linked in a user module of the transport system control to a certain parameter or parameter set for the transport system component in question. Thus, the ID of the mobile device could e.g. be allocated to a "handicapped" people group in which case by simply reading the ID of the mobile device, the transport system control is able to set for the allocated elevator to "handicapped" standard, e.g. the door parameters of an elevator door to longer door opening times and slower door speeds, activation of audio signalling of allocated elevators and trip data as well as slower acceleration and/or speed of elevator/escalator drive.

Another possibility is to issue via the mobile device selection data which selection data specifies one parameter or parameter set out of several stored in connection with the transport system control, particularly in a memory of the control panel of the transport system control.

A third possibility is to store parameters or parameter sets on the mobile device itself so that the mobile device directly issues the operational or operational parameter of the transport system component via the interface to the transport system control to control the operation of the corresponding transport system component. In any case, the operation of components of the transport system component is affected by data which is communicated from the mobile device to the wireless interface, which is located in the vicinity of the correlated transport system component so that the operation parameter or parameter set of said component is affected by the data from the mobile device.

These passenger transport components can for example be the door controller of an elevator, the elevator or escalator motor whereby the corresponding operation parameters are motor speed and motor acceleration, illumination, input and/or output components as operating panels, displays, push-buttons, touch-screens, loudspeakers, microphones etc. Another transport system component could be a ventilator or illumination in an elevator car or even a pollution filter located there. Further related transport system components could be illumination in the passenger transport system lobby, e.g. elevator lobby or even illumination in different parts of a building or environment if the passenger transport system is also connected a guide system for guiding the user to a specified location in the building or environment. The parameters are preferably user-related but can also be time-related in which case the transport system component may be an allocation control of an elevator so that different traffic conditions at the different times of the day could be met via adjusting the corresponding call allocation parameters. A passenger transport component could also be an elevator allocation control module in an elevator group control, in which case not only the allocation parameters could be changed but also the operation mode of the allocation control for example from continuous call allocation to destination call allocation and vice versa.

The transport system control may be an elevator (group) control, an escalator (group) control, or a mixed common control for these both types of passenger transport systems.

In case the passenger transport system is also correlated with an access system which may e.g. happen in hotels, the parameters communicated by the mobile device can also be access parameters of the hardware of the access system, as. e.g. admitted floors in an elevator group, electric door locks, ID recognition means etc. Thus, the electric door locks of hotel rooms could for example be provided with wireless interfaces also working in a short range transmission technology, so that the mobile device may be able to open the door lock without interaction of the user, if he is in close proximity to an access door.

In connection with a guide and access system the invention could also work as follows: The passenger enters the building with his smartphone already registered as I/O means of the passenger transport system of the building and to the related guide and access system. When entering the elevator lobby of the base floor his smartphone interacts with the wireless interface to automatically issue a destination call. Further with the interaction the operating parameters of components of the elevator group which are relevant for the individual travel are set to e.g. the user group to which the user belongs. Maybe the user has selected on his smartphone a theme for displays and illumination, which will then be used by all display and illumination components of the elevator group as well as by the components of the guide system during the trip of the passenger through the building to his destination. Thus, the user is driven to the correct destination floor and is guided by the illumination components of a guide system to the correct door. When the user reaches the door, the door opens automatically when the user gets near enough, e.g. within a radius of 1 to 2 m, to a third short range wireless interface interacting with the door lock. This has also the advantage that the user who sometimes is hampered by luggage does not have to insert an ID card into the door lock but the door opens automatically so that he can immediately enter the room. This offers an optimum of individual service to his destination.

In a preferred embodiment of the invention, the parameter memory may be located in a control panel of the transport system control. Of course, the parameter memory may also or alternatively be located in the mobile device.

The mobile device can be a special mobile device handed over to the users of the passenger transport system or may simply be a smartphone to which an application (App) has been uploaded which provides to the smartphone the functionality of a user input/output device of the passenger transport system and optionally of a correlated guide system and optionally of a correlated access system.

The application may be downloaded to the smartphone via the same interface which are used to transmit an operation parameter or parameter set from the mobile device to the passenger transport control or the transport component directly or it may be a second separate interface which is for example only located at certain locations in the environment of the passenger transport system. This second interfaces are only designed to upload application data to a smartphone if the smartphone gets in the short transmission range of the second wireless interface and the user accepts the download of the App.

Preferably, when downloading an App via the first or second interface, some parameters handled by the App may be location-depend or default (or fixed) value. If for example the user downloads the application in his home floor, that floor may be set as users home floor.

Preferably, the transport system control comprises a user module configured to link a parameter or parameter set to a certain user or user group of the passenger transport system. This ensures the transmission of only ID data of the mobile device to allocate the transport system component a certain parameter or parameter set which is linked to the user or user group correlated with the ID of said mobile device.

Generally, with the invention only one parameter of a component can be set with the present invention or a whole set of parameters. Further the transmission via the interface can lead to the setting of parameters at several system components at the same time or in a succession (e.g. guide illumination in the destination is only activated after elevator has reached the destination floor).

In a preferred embodiment of this technical solution, the user module comprises for each user or user group a corresponding route in the passenger transport system or in the environment in which the passenger transport system is embedded, e.g. a mall, an office or residential building, a hotel or an airport whereby at least some, preferably all interface controlled distributed transport system components along said route are controlled in line with the parameter or parameter set selected via the communication between the interface and the mobile device. In this case, the passenger transport system may also be connected with a guide system. Accordingly, for example floor illuminations could be activated along the route of the user, or a special guiding light may be activated along his path to this destination. Via this illumination, he can be guided directly to his destination, for example a hotel room.

If the parameter or parameter set transmitted by the mobile device or selected via the mobile device is user dependent or user group dependent, then a collision might occur when several users of the passenger transport system get into the vicinity of the wireless interface at the same time. In this case, the passenger transport system preferably comprises a colliding module to select an appropriate operating mode for this situation. The colliding module then e.g. either sets the parameters in the overlapping route area of the different mobile devices (users) according to a priority parameter of the user or user group or alternatively does not change the parameters of the passenger transport component at all in the overlapping route area if several different user or user groups with the same priority are present in the transmission range of the correlated interface. Simply said, in this case, the passenger transport system does not change any parameters if different users or user groups with the same priority are located in a vicinity of the interface but the parameters are selected according to a priority if users or user groups with a different priority are present in the transmission area of the interface. This technology provides reasonable handling of possible colliding parameter settings in case the passenger transport system is quite crowded.

In a preferred embodiment of the invention it is also possible to activate the wireless interface or to allow a parameter change of a component based on the communication between the wireless interface and the mobile device only at certain times or at certain locations of the passenger transport system.

Usually, in the base floor elevator lobby many users are present which makes it nearly impossible to change parameters in said area. Anyway, usually at other floors (destination floors), the number of users essentially decreases so that in these destination floors the parameters maybe set based on the communication between the interface and the mobile devices at the base floor according to the requirements of the different users. This means that the use of the parameter setting influenced by the wireless interface may be limited to certain locations of the passenger transport system. The other option which can be realized at the same time is to activate this user-based parameter change only at certain times, usually at times when there is not any heavy traffic in the passenger transport system. During heavy traffic times, the passenger transport system is quite crowded so that the parameter change according to the interaction with mobile devices may be deactivated. But also at these times the inventive system may be activated only for certain user groups having a high priority, e.g. handicapped people, emergency use or VIP people.

In a preferred embodiment of the invention, the mobile device comprises a display for displaying the parameters or parameter sets of the correlated passenger transport component to the user and input means for selecting a parameter or parameter set out of these. If this technology is for example considered with respect to lightning, certain colours or themes for the lightning could for example be selected by the passengers by using a menu on the display of their mobile devices. Usually, a smartphone has a touch screen which serves at the same time as display (output device) as well as push button (input device) for selecting a certain parameter set out of the displayed parameter sets or themes. The selected parameters or parameter sets may then be stored in a memory of the mobile device and may be communicated to the interface when coming into its short range transmission area.

As it has been mentioned above, the parameters may refer to the activation (on/off) or colour of illumination or to the display of certain themes, to the activation of sound for informing the passenger of transport system activity, e.g. destination floors or allocated elevators. The parameters may also be door opening times or door closing velocity, elevator car acceleration, elevator car speed, escalator acceleration, escalator speed, ventilation of elevator car, activation of pollution filters in an elevator car. If the passenger transport system is also correlated with a guide system and with an access system in the environment, the parameters can also include illumination activity and/or colour in different areas of the environment as well as unlocking of electric door locks in the environment.

In a preferred embodiment of the invention, the wireless interface is a bidirectional interface which is for example able to transmit parameter data to the mobile device for selection by the mobile device user.

In case a second interface for the transfer of the App to a smartphone is used, the second interface is preferably a transponder, preferably a Bluetooth® transponder, which technology is easy to realize.

Preferably, the interface or the transport system control comprises a detection circuit configured to sense the existence of a mobile device within its transmission range. The detection of the existence could automatically lead to the sending of a signal which initiates the mobile device to transmit data to the interface referring to the selection of a certain parameter or parameter set of at least one transport system component.

In a preferred embodiment of the invention, the mobile device does not only transmit data relating to the selection of a certain parameter or parameter set of a transport passenger component, but also destination data for the passenger transport system and/or for the environment where it is located so that the mobile device could at the same time be used as a means to output a destination to a guide system of the environment of the transport system.

The mobile device may also carry a certain ID which is correlated with defined access rights to areas of the passenger transport system or its environment. In this connection, the mobile device can also be used as a means in an access system connected with the passenger transport system. The access right does not only relate to certain accessible floors of an elevator but also the unlocking of an electric door lock in an area of the environment, e.g. a hotel room.

Therefore, the invention combines in an advantageous manner different functions of a passenger transport system, of a guide system as well as of an access system of an environment in one technical solution.

It is apparent for the skilled person that the above-mentioned embodiments can be combined with each other arbitrarily.

BRIEF DESCRIPTION OF THE DRAWINGS

The invention is hereinafter described via an example in connection with the schematic drawings.

DESCRIPTION OF THE PREFERRED EMBODIMENTS

Figure 1:
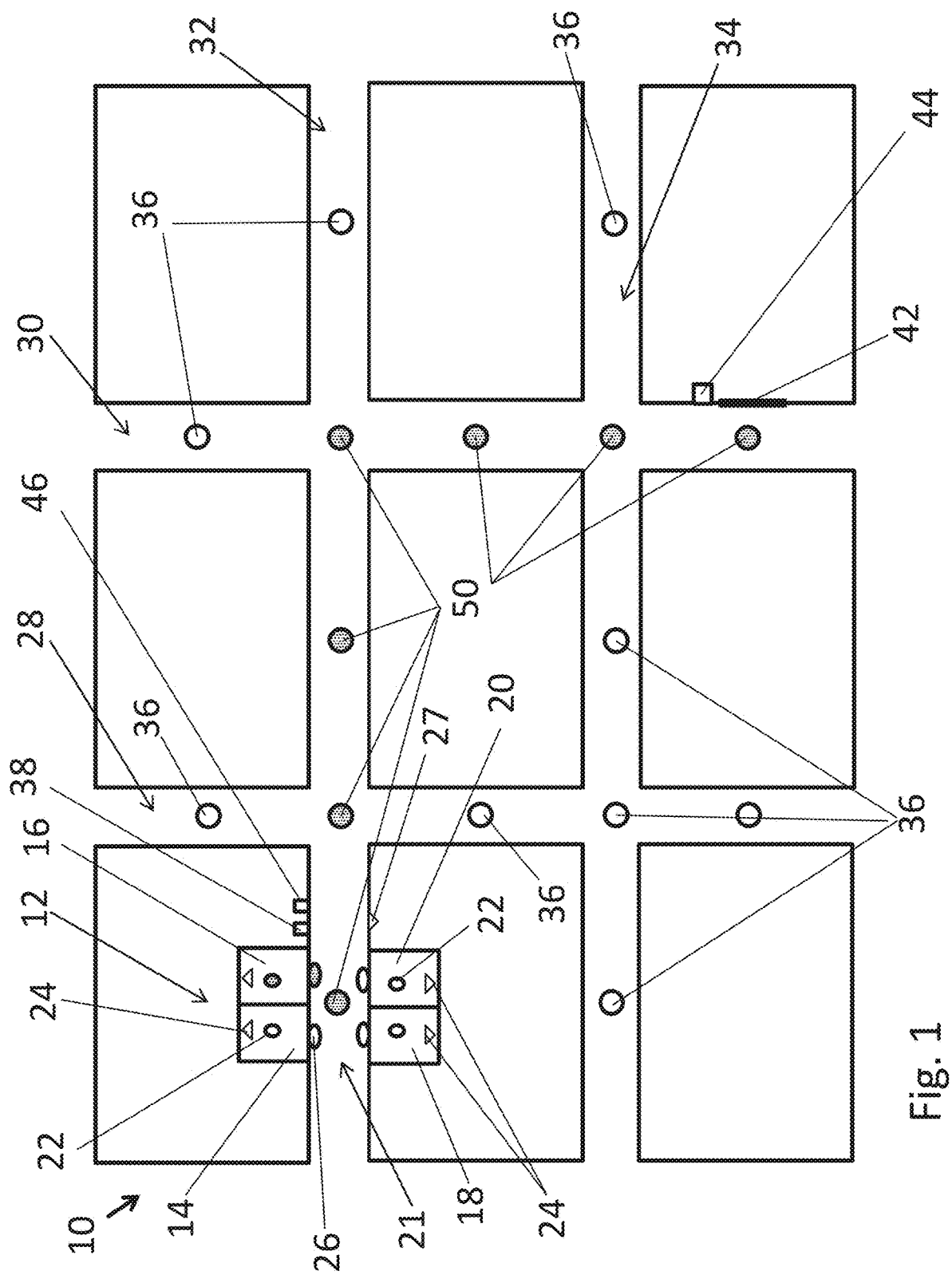
FIG. 1 shows a schematic diagram of an environment comprising a passenger transport system (elevator group), a guide system as well as an access system.

FIG. 1 shows a map of a residential building 10 having a passenger transport system embodied as elevator group 12 comprising four elevators 14, 16, 18, 20. The different elevators 14, 16, 18, 20 comprise their own car illumination components 22 as well as a loudspeaker 24 for giving audible information to passengers, for example to blind passengers. In the elevator lobby 21 an indication panel 26 is located in the front of each elevator 14, 16, 18, 20, which indication panel is configured to show data regarding the allocation of elevator car or regarding the arrival or departure of elevator cars. This indication panel 26 may also show destination floors which are comprised in the route of the respective elevators 14, 16, 18, 20. Furthermore, in the elevator lobby 21 in front of the elevators 14, 16, 18, 20 as well as in corridors 28, 30, 32, 34 of the building 10, illumination elements 36, 50 are located. In the elevator lobby also a destination operating panel may be located which is per se known in destination call systems.

Further, in the elevator lobby 21, a first wireless interface 38 is located which is configured to interact with a mobile device (see FIG. 2) within a short wireless transmission range to set parameters of the elevator group 12 or of the illumination elements 36 of the building or of an electric lock in an access door 32, which electric lock is provided with a third interface 44 to retrieve access data from the mobile device 40.

Furthermore, in the elevator lobby 21 a second interface 46 is located, which is preferably a Bluetooth transponder, configured to upload an App to a smartphone of a user staying in the short range transmission area of the second wireless interface. The App enables the smartphone 40 to act as I/O device of the elevator group 12 as well as of the correlated guide system 36, 50 as well as of the correlated access system 42, 44.

The illumination elements 36, 50 in the corridors 28, 30, 32, 34 can be selectively controlled to guide a passenger from the elevator lobby 21 to an access door 42 in the residential building 10. This can for example be realized by selectively activating only the illumination elements 50 between the elevator lobby 21 and the access door 42 while the other illumination elements 36 remain switched of or shine with a different colour or theme.

Figure 2:
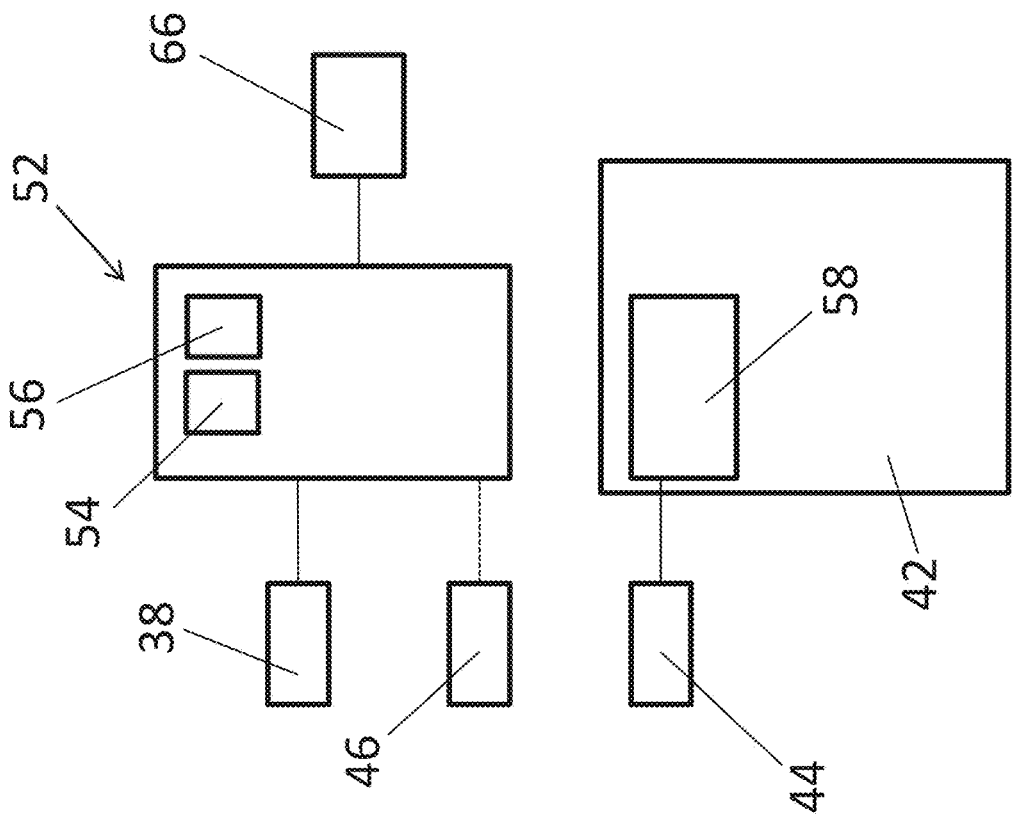
FIG. 2 shows a schematic diagram of the interaction between a system according to FIG. 1 and a smartphone operating as I/O interface for the system.

FIG. 2 shows the interaction of a smartphone 40 having uploaded an App as to act as an IO interface, i.e. as a mobile device of the passenger transport system 12 and guiding system 36, 50 and access system 42, 44 as shown in FIG. 1. The smartphone has a touchscreen 60 which for display and input of data.

The smartphone 40 communicates via a short range communication protocol, preferably Bluetooth® with the first interface 38 which is connected to an elevator group control 52 of the elevator group 12. The elevator group control 52 comprises a memory 54 for operation parameters of the different components of the elevator group and guide system and access system as well as a user module 56 which correlates certain operation parameters of components of the elevator group or guide system or access system with certain users or user groups. Furthermore, the elevator group control 52 might be connected (not necessarily) with the second interface 46 which can also be configured as a stand-alone unit to upload an App to a smartphone to enable the smartphone to act as a mobile device of the elevator group and/or guide system and/or access system.

Finally, a third interface 44 is connected with a door lock 58 of the access door 42. The third interface is also able to perform short range communication with the smartphone 40 in connection with the guide and access system according to FIG. 1. The third interface maybe a Bluetooth®-transponder.

Figure 2A:
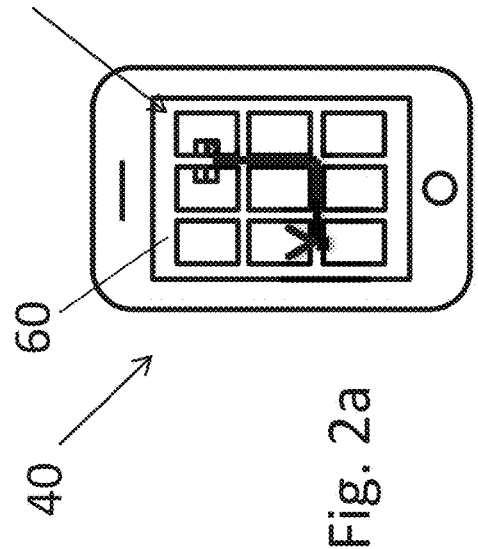

The smartphone's touch screen 60 is according to FIG. 2a able to display a map 64 of the destination floor of the building 10, in which map the route between the elevator group 12 and the user's access door 42 may be indicated. The smartphone also may have a GPS system to enable the smartphone to indicate the current position of the user on this route.

Figure 2B:
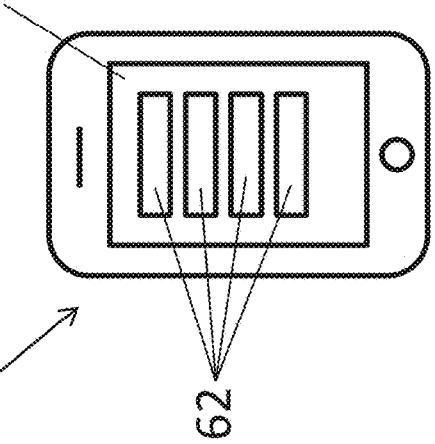

The smartphone's touch screen 60 is according to FIG. 2b able to display a selection menu 62 enabling the user to select parameters or parameter sets, eventually in connection with certain display themes, as they are commonly used in smartphone or computer displays.

The function of the system shown in FIGS. 1 and 2 is described hereinafter in detail:

During a first visit of a user to the building 10, the user gets into a range of the second interface 46 located in the elevator lobby 21. The user carries a smartphone 40 and is then prompted by the second interface to upload an App which configures the smartphone as an input/output device of the elevator group 12 and guide system 36, 50 and access system 42, 44, 58. After starting the App on the smartphone 40, the user is presented a selection menu 62 (FIG. 2b) for selecting certain user-specific settings as e.g. default departure floor, default destination floor, illumination parameters, e.g. themes and visual display during the ride of the passenger in the building, as well as certain options, e.g. whether or not the smartphone shall also be used as a guide means in the building 10 and as an access means for gaining access into certain areas of the building 10 which are closed by access doors 42. Optionally, the settings made by the user by pushing certain buttons in the selection menu 62, the settings may be checked after transmission between the smartphone 40 and the first wireless interface 38 by the elevator group control 12 which is also connected with an access database 66 of the building 10. After the settings of the user via the selection menu 62 are confirmed by the elevator group control 52, the smartphone 40 acts as an input/output device to set parameters of related elevator components 24, 22, 26 as well as to control illumination elements 36, 50 of the building 10 and to provide access to access doors 42 in the building.

If e.g. the user has selected the theme "winter" this means that the illumination elements 36, 50 in the building 10 as well as the illumination car components 22 of the elevator group 12 will indicate user and guide data with blue snowy coloured display symbols.

When the user enters the elevator lobby 21 with already configured smartphone 40 in the base floor of the building 10 he gets into the short transmission range of the first interface 38 which prompts the smartphone 40 to issue data, e.g. the ID of the user. Via this ID, the elevator group control 52 sets all illumination of the elevator group 12 and of the illumination elements 36, 50 in the building 10 to the theme selected by the user. Further, the allocation control of the elevator group control 52 automatically allocates a destination call with the current departure floor and the set destination floor whereupon one 16 of the four elevators 14, 16, 18, 20 is allocated to his automatic call which is displayed on the touch screen 60 of the smartphone 40 as well as on the indication panel 26 above the allocated elevator 16. The elevator group control does not only get the route data of the user in the elevator group 12 but also operating parameters of the elevator group. Thus, the indication panel 26 above the allocated elevator shows for example the colour of the selected theme of the user which colour is also used in the illumination component 22 of the elevator car. Furthermore, the ID of the smartphone 40 is correlated in the user module 56 of the elevator group control with a certain user group. If the user group is for example "blind passengers" particular signalling for visually impaired passengers 24 is activated in the allocated elevator 16, which includes acoustic signalling via the loudspeakers 24 in the elevator and via a loudspeaker 27 in the lobby 21. Thus, he can be informed where his allocated elevator is located, the door opening time can be prolonged and during the trip the passenger can be acoustically informed when his destination floor has been achieved. When the passenger exits on the destination floor, he can also be acoustically guides when aside of the illumination elements acoustic guide elements are provided.

For guiding purposes the illumination elements 50 corresponding to his preset route can be illuminated in his theme colour, e.g. blue, which leads him directly to the access door 42 of his room in the building 10. Instead or additionally to the illumination elements 50, also acoustic notification elements could be used which give for example certain signals which may easily be acknowledged by visually impaired persons to belong to his selected route. After having arrived in front of his access door 42, the electric door lock 58 of his access door 42 can be automatically released when the mobile phone 40 comes into the short transmission range of the third interface 44 which is connected with the electric door lock 58. The door lock 58 can obtain ID or access data either centrally via a building control or the elevator group control 52 or via transmission between the smartphone 40 and the third interface 44. Accordingly, the third interface 44 can also be used to transmit access data to the electric door lock 58.

It is clear that the selected operating parameters may be either manually selected or selected by the fact that the user belongs to a certain user group defined in the user module 56 of the elevator group control 52. Accordingly, when the user is handicapped, the door opening times of the elevator door as well as the door speed may be reduced. Simultaneously, the travel velocity of the elevator (and of possible escalators or moving walks) as well as its acceleration may be reduced.

The present invention therefore offers a wide variety of possibilities to adjust different components of a passenger transport system, as e.g. an elevator group to certain individual needs of a user as well as to guide a user through an environment, e.g. a building 10 up to his final destination in the building.

The invention is not restricted to the described embodiment but may be varied within the scope of the appended patent claims.

LIST OF REFERENCE NUMBERS

10 building (environment)
12 elevator group (passenger transport system)
14 first elevator
16 second elevator
18 third elevator
20 fourth elevator
21 elevator lobby
22 car illumination component
24 car loudspeaker
26 indication panel
27 lobby loudspeaker
28 first corridor
30 second corridor
32 third corridor
34 fourth corridor
36 illumination element (not-activated) of the guide system
38 first wireless interface
40 smartphone
42 access door
44 third wireless interface
46 second wireless interface
50 illumination element (activated) of the guide system
52 elevator group control (passenger transport system control)
54 memory
56 user module
58 electric door lock
60 touchscreen of smartphone
62 selection menu
64 map with route display

The invention claimed is:

1. A passenger transport system, the passenger transport system comprising:
a transport system control device configured to control operations of one or more passenger transporters, the transport system control device further configured to control operation of a transport system component of the passenger transport system according to a parameter, the parameter associated with functionality of the transport system component, such that a value of the parameter indicates an operational configuration of the transport system component;
a first wireless interface associated with a first transmission range, the first wireless interface communicatively coupled to the transport system control device, wherein the first wireless interface is configured to receive, from one or more mobile devices, data associated with the parameter based on the one or more mobile devices being within the first transmission range of the first wireless interface; and
a user module configured to associate different values of the parameter to different users or user groups of the passenger transport system,
wherein the transport system control device is further configured to control the transport system component according to a particular selected value of the parameter, of a plurality of values of the parameter, in response to processing the data associated with the parameter that is received at the first wireless interface from the one or more mobile devices located within the first transmission range of the first wireless interface,
wherein the transport system control device is further configured to control the transport system component according to the particular selected value of the parameter based on a determination that
the one or more mobile devices located within the first transmission range are associated with a particular user or user group, and
the particular user or user group is associated with the particular selected value of the parameter.

2. The passenger transport system according to claim 1, wherein
the transport system control device is further configured to control the transport system component according to a stored value of the parameter, the stored value of the parameter stored in a parameter memory, and
the parameter memory is located in a control panel of the transport system control device.

3. The passenger transport system according to claim 1, wherein the first wireless interface is connected with the transport system control device.

4. The passenger transport system according to claim 1, wherein the user module is configured to
associate separate routes in the passenger transport system or corresponding environment with different corresponding users or user groups of the passenger transport system, and
control all interface controlled transport system components associated with the parameter along each separate route in accordance with a separate value of the parameter that is associated with a separate corresponding user or user group with which the separate route is associated.

5. The passenger transport system according to claim 1, further comprising:
a colliding module configured to select the particular selected value of the parameter from the plurality of values of the parameter based on a determination that two or more mobile devices of the one or more mobile devices are within the first transmission range of the first wireless interface, the two or more mobile devices associated with different values of the parameter, the selecting including selecting a particular value of the parameter that is associated with a highest priority mobile device of the two or more mobile devices in response to a determination that the two or more mobile devices are associated with different priorities.

6. The passenger transport system according to claim 1, wherein the parameter is at least one of
illumination,
sound,
door closing velocity,
car acceleration,
car speed, ventilation, or activation of pollution filters.

7. The passenger transport system according to claim 1, wherein the parameter is dependent on a location of the one or more mobile devices and/or time.

8. The passenger transport system according to claim 1, wherein the first wireless interface is bidirectional.

9. The passenger transport system according to claim 1, further comprising:

a second wireless interface configured to transmit application data to a smartphone to configure the smartphone to act as one mobile device of the one or more mobile devices, wherein the second wireless interface is a transponder.

10. The passenger transport system according claim 1, wherein the first wireless interface is configured to transmit a selection menu associated with the parameter to at least one mobile device of the one or more mobile devices, and the at least one mobile device is configured to display the selection menu and transmit a selected value of the parameter to the first wireless interface.

11. The passenger transport system according to claim 1, wherein at least one device of the first wireless interface or the transport system control device includes a detection circuit configured to sense a presence of at least one mobile device of the one or more mobile devices within the first transmission range of the first wireless interface.

12. The passenger transport system according to claim 1, wherein the transport system component includes illumination and/or video/audio output of travel data.

13. The passenger transport system according to claim 1, wherein the transport system component includes a guiding system including one or more illumination elements distributed over a building, the one or more illumination elements configured to be controlled by the transport system control device in accordance with the parameter.

14. The passenger transport system according to claim 1, wherein the transport system component includes an access system including one or more electric door locks in a building, each door lock of the one or more electric door locks including a third wireless interface configured to receive locking/release data from at least one mobile device of the one or more mobile devices.

15. The passenger transport system according to claim 1, wherein the first wireless interface is in a transport system lobby, and at least one mobile device of the one or more mobile devices is configured to automatically transmit destination floor data to the first wireless interface in response to the at least one mobile device being within a particular proximity of the first wireless interface in the transport system lobby.

16. The passenger transport system according to claim 1, wherein the transport system component is an elevator door and the parameter is a door opening time of the elevator door and/or a door velocity of the elevator door.

17. The passenger transport system according to claim 1, wherein the first wireless interface is located in a particular vicinity of the transport system component.

* * * * *